US007664855B1

United States Patent
Freed et al.

(10) Patent No.: US 7,664,855 B1
(45) Date of Patent: Feb. 16, 2010

(54) PORT SCANNING MITIGATION WITHIN A NETWORK THROUGH ESTABLISHMENT OF AN A PRIOR NETWORK CONNECTION

(75) Inventors: Michael Freed, Pleasanton, CA (US); Robert M. Krohn, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1005 days.

(21) Appl. No.: 10/839,187

(22) Filed: May 5, 2004

(51) Int. Cl.
G06F 15/173 (2006.01)
G06F 9/00 (2006.01)
G06F 15/16 (2006.01)
G06F 17/00 (2006.01)
G06F 11/00 (2006.01)
G06F 12/14 (2006.01)
G06F 12/16 (2006.01)
G08B 23/00 (2006.01)

(52) U.S. Cl. .................... 709/225; 726/12; 726/23
(58) Field of Classification Search ......... 709/223–229, 709/218; 726/11–15, 23
See application file for complete search history.

(56) References Cited

U.S. PATENT DOCUMENTS

| 6,970,943 | B1 | 11/2005 | Subramanian et al. |
| 6,975,628 | B2 | 12/2005 | Johnson et al. |
| 7,162,740 | B2 * | 1/2007 | Eastlake, III ................. 726/23 |
| 7,203,740 | B1 | 4/2007 | Putzolu et al. |
| 7,301,899 | B2 * | 11/2007 | Goldstone ................. 370/230 |
| 7,362,763 | B2 | 4/2008 | Wybenga et al. |
| 7,496,955 | B2 | 2/2009 | Akundi et al. |
| 2002/0095492 | A1 * | 7/2002 | Kaashoek et al. ........... 709/224 |
| 2002/0126621 | A1 | 9/2002 | Johnson et al. |
| 2003/0097557 | A1 * | 5/2003 | Tarquini et al. ............. 713/153 |
| 2003/0110274 | A1 * | 6/2003 | Pazi et al. .................... 709/229 |
| 2004/0015721 | A1 * | 1/2004 | Eastlake, III ................. 713/201 |
| 2004/0107286 | A1 * | 6/2004 | Larson et al. ............... 709/229 |
| 2004/0111635 | A1 * | 6/2004 | Boivie et al. ................. 713/201 |
| 2005/0144441 | A1 * | 6/2005 | Govindarajan ............. 713/160 |

(Continued)

OTHER PUBLICATIONS

"Well-Known TCP Port Number," www.webopedia.com, 3 pages.

(Continued)

Primary Examiner—Benjamin R Bruckart
(74) Attorney, Agent, or Firm—Shumaker & Sieffert, P.A.

(57) ABSTRACT

Techniques are described for mitigating adverse effects of port scanning within a network device. For example, an apparatus, such as a router, responds to all network connection request packets received from a client for all ports on an attached server as if all of the server's ports are open. Once a network connection is established between the router and the client, a network connection request is transmitted to the server for a requested port. Using the router to establish a full network connection with the client eliminates a unscrupulous client from sending numerous decoy network connection request messages in an effort to hide the identity of the client. By responding to all network connection requests by establishing a TCP full connection before a network connection request is forwarded to a server, a client receives no useful information regarding the state of a port on the server before providing a valid and detectable IP address. Stealth port scanning is rendered ineffective. Only connect scan-type port scanning, which is both detectible and defendable, may be used to identify open ports on a server.

18 Claims, 7 Drawing Sheets

U.S. PATENT DOCUMENTS

| | | | |
|---|---|---|---|
| 2005/0160289 A1* | 7/2005 | Shay | 713/201 |
| 2006/0089994 A1* | 4/2006 | Hayes | 709/227 |
| 2006/0185008 A1* | 8/2006 | Le et al. | 726/11 |
| 2007/0180511 A1* | 8/2007 | Eastlake, III | 726/11 |
| 2007/0294369 A1* | 12/2007 | Ginter et al. | 709/217 |

OTHER PUBLICATIONS

"TCP Packet Field Descriptions," www.ipanalyser.co.uk, Analyser Sales Ltd., Copyright 2003, 2 pages.

Michael Egan, "Decomposition of a TCP Packet," www.passwall. com, 4 pages, Aug. 7, 2000.

Mark Gibbs, "A Guide to Original SYN," www.nwfusion.com, Network World, Nov. 2000, 2 pages.

Michael Egan, "Sample TCP/IP Packet," www.passwall.com, Version 0.0.0 @ 03:55/Aug. 7, 2000, Copyright 2002, 9 pages.

D.J. Bernstein, "SYN Cookies," http://cr.yp.to/syncookies.html, Oct. 2003, 3 pages.

Jonathan Lemon, "Resisting SYN Flood DoS Attacks with a SYN Cache," http://people.freebsd.org/~ jlemon/papers/syncache.pdf, 9 pages.

Stuart Staniford, et al., "Practical Automated Detection of Stealthy Portscans," http://downloads.securityfocus.com/library/spice-ccs2000.pdf, 16 pages.

"Proceedings of the BSDCon 2002 Conference," USENIX Association, San Francisco, California, Feb. 11-14, 2002, 10 pgs.

Juniper Networks, Inc., "Combating Bots and Mitigating DDoS Attacks", Juniper Networks, Inc., 2008, entire document, http://www.juniper.net/solutions/literature/solutionbriefs/351198.pdf.

* cited by examiner

PORT SCANNING MITIGATION WITHIN A NETWORK THROUGH ESTABLISHMENT OF AN A PRIOR NETWORK CONNECTION

TECHNICAL FIELD

The invention relates to computer networks and, more particularly, to port scanning mitigation within computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Computing devices that provide data and resources, such as servers attached to a network, provide this data and these computing resources to clients through the use of network ports associated with the servers. A network port is a logical connection to the server that is associated with a particular source of data or with a particular service provided by the server. For example, port 80 is a well known port for the Transmission Control Protocol (TCP), and is typically used to provide a hypertext transfer protocol (HTTP) connection to a client requesting an HTTP connection with the server. As such, any HTTP connection request initiated between any client and the server will attempt to establish the communications connection using port 80 on the server. Many other well known ports are used to provide similar services, such as domain name resolution (port 43), Simple Mail Transfer Protocol (SMTP) electronic mail transfer (port 25), Post Office Protocol (POP3) electronic mail retrieval service (port 110), and Dynamic Host Configuration Protocol (DHCP) service (port 547), among others. Port numbers may range between 0 and 65536 under the TCP communications protocol, where well known ports associated with standard networking services use ports 0 to 1024.

This use of ports on servers to provide access to data and other resources enables any client attached to a network the ability to determine whether a particular server provides a particular service by simply attempting to establish a session with the server over the corresponding well known port. More specifically, the client transmits a service request to the network address for the server and specifies the particular port of interest. If the server provides the service associated with the specified port, the server establishes a connection between the server and the client. If the server does not provide the service associated with the particular port of interest, the server does not establish the connection. When the connection is not established, the server either may transmit a reset message to the client indicating that the particular port of interest in not open or may not transmit any response at all. If there is an intermediate firewall, the firewall may block messages depending upon configuration setting for the firewall at the particular port of interest.

Consequently, clients may issues service requests to all well known ports of a server to identify all of the services provided by the server. This process is generally referred to as "port scanning." Unfortunately, port scanning is utilized by some unscrupulous clients to identify servers that are vulnerable to attack through an open port. Because of this use of port scanning, servers may attempt to identify when a port scan is occurring, identify the source, e.g., network address, of the client performing the port scan, and block further scanning if the client is believed to be unscrupulous. Port scanning activities generally fall into two categories of scanning. A first type of port scanning, referred to as a "connect scan-type," is the easiest to detect and prevent. In the connect scan-type of port scan, a client initiates and ultimately establishes a full connection with the server for each service provided by the server. As a result, the network address for the client is provided to the server, thereby providing the server with the identity of the client performing the scan. Therefore, many well-known procedures for detecting and hindering clients from attacking a server using the connect scan-type port scan.

A second type of port scan, typically referred to as a "half open" scan or a "stealth" scan, may also be used. In a stealth scan, a port scanning client initiates but does not complete the establishment of a connection for each of the services. As with the connect-type port scan, the port scanning client receives a response from the server when an open port is found; however, the port scanning client does not complete the message exchange necessary to fully establish the connection. Because of this fact, the unscrupulous client may transmit a large number of messages initiating establishment of a connection where each of these messages possess a different network address. The server will respond to each of these TCP request messages, but only one such response actually reaches the unscrupulous client. Consequently, the server possesses no information to identify the actual request from the unscrupulous client from all of the other decoy service requests. As such, a server may realize that a stealth port scan is occurring while not being able to identify the client, or its IP address, that is initiating the port scan. The server may be unable to prevent the stealth port scan without rejecting service requests from legitimate clients. As a result, many servers providing data and related services to clients remain vulnerable to potential attack by unscrupulous clients through successful use of a stealth port scan.

SUMMARY

In general, the invention is directed to techniques for mitigating port scans within networks. The techniques involve the use of an intermediate network apparatus, referred to herein as an "intrusion prevention device, that resides between a server and any potentially unscrupulous client. In particular, the intrusion prevention device intercepts all network connection requests directed to the server, and responds on behalf of the server. More particularly, the intrusion prevention device responds to all network access request as if the target port were open on the server regardless of the actual status of the port, and requires the client to proceed in fully establishing the corresponding network connect before communicating with the server.

Once a network connection is established between the intrusion prevention device and the client, the intrusion prevention device transmits a network connection request to the server for a requested port. Using the intrusion prevention device to establish a full network connection with the client prevents an unscrupulous client from sending numerous decoy network connection request messages to the server in an effort to hide the identity of the client. By responding forcing the client to establish a full network connection for all network connection requests before a network connection request is forwarded to a server, the client receives no useful information regarding the state of a port on the server unless the client provides a valid and detectable IP address. Stealth port scanning, therefore, is rendered ineffective. Consequently, only connect scan-type port scanning, which is both detectable and defendable, may be used to identify open ports on the server.

In one embodiment, a method comprises intercepting a client service request from a client to a server with an intrusion prevention device (IPD), wherein the client service request requests a network service from the server using a specified port and attempting to establish a network connection between the IPD and the client prior to determining whether the server provides the requested service on the specified port.

In another embodiment, an intrusion prevention device includes a control process module, a connection proxy module for establishing a first network connection with a client in response to a request to establish a network connection from the client to a server using a specified server port and for establishing a second network connection with the server in response to the request to establish a network connection from the client to a server using the specified server port, and a packet data processing module for modifying data packets transferred between the client and server through the intrusion prevention device. The connection proxy module establishes the second network connection after the first network connection is established.

In another embodiment, a computer-readable medium comprises instructions to cause a processor within in the intrusion prevention device to intercept a client service request from a client to a server with an intrusion prevention device (IPD), wherein the client service request requests a network service from the server using a specified port. The instructions cause the processor to attempt to establish a network connection between the IPD and the client prior to determining whether the server provides the requested service on the specified port.

The techniques may provide one or more advantages. For example, the techniques may require that clients requesting to establish a network connection with a server completely establish a connection with the intermediate intrusion prevention device before the client is informed whether the server accepts network connections using the specified server port. As such, a port scanning client that transmits network connection requests to multiple server ports of the server does not obtain useful information regarding status of the multiple ports until a network connection is established with the intrusion prevention device.

In other words, the intrusion prevention device obtains a valid and known network address for all clients requesting to establish a network connection with the server before useful information regarding the status of a particular server port is provided. The intrusion prevention device or the server may retain the known and valid network address for the client in order to permit use of well known techniques to reduce adverse consequences as a result of the port scanning activities.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
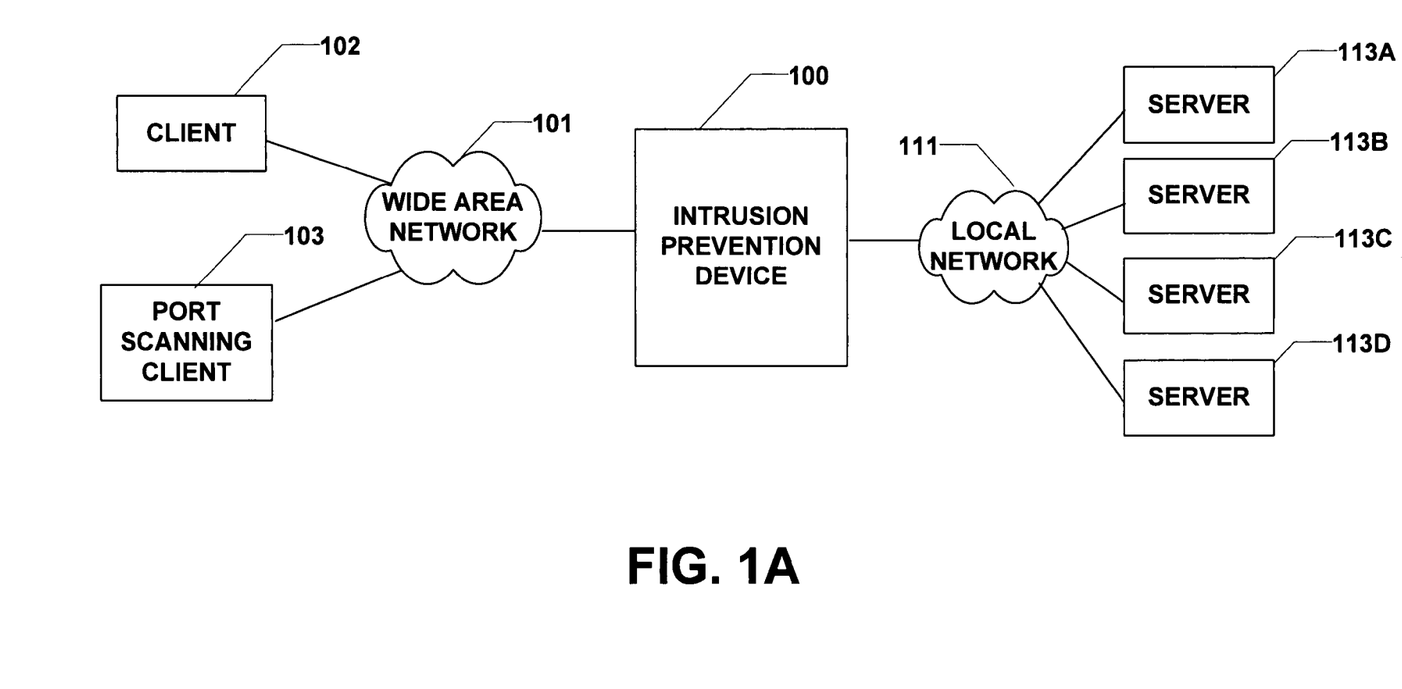
FIG. 1A is a block diagram illustrating an example network environments including an intrusion prevention device (IPD) that demonstrate the principles of the invention.

FIG. 1A is a block diagram illustrating an example network environment including an intrusion prevention device (IPD) 100 that operates in accordance with the principles of the invention. IPD 100 may be connected between a wide area network 101, such as the Internet, and a local network 111, such as an enterprise network. IPD 100 may be used to permit client 102 to access data and resources on one or more of servers 113A-113D (collectively, "servers 113") while deterring port scanning client 103 from performing a stealth scan on any of servers 113. For illustrative purposes, the techniques are described herein in reference to the Transmission Control Protocol (TCP). These techniques are described for exemplary purposes only, and other networking protocols may also be used in accordance with principles of the present invention.

Client 102, which represents a legitimate client, issues a request to establish a network connection to server 113A, for example. IPD 100 intercepts the request, and exchanges a sequence of TCP data packets with IPD 100 to establish a network connection with the IPD. Once the first network connection is established between client 102 and IPD 100, IPD 100 establishes a second network connection with the requested server 113A. Once both the first network connection and the second network connection are established, client 102 begins communicating with server 113A. During establishment of the first and second network connections, IPD 100 acts as a proxy server between client 102 and server 113A. As data packets are exchanged between client 102 and server 113A following the establishment of both the first and the second network connections, IPD 100 changes operation as a proxy server to operating as a server that makes minor modifications to data packets before forwarding the modified data packets to a destination.

In order to deter port scanning client 103, which generally represents an unscrupulous client, from performing a stealth scan of servers 113, IPD 100 responds to initiation of a first network connection request to a particular port of one of servers 113 as if the particular port is active regardless of its actual state. In this manner, the first network connection is established prior to IPD 100 determining whether server 113A possesses an open port corresponding to the particular port specified within the first network connection request. Moreover, IPD 100 will attempt to establish a second network connection with the requested one of servers 113 only after port scanning client 103 has completely established the first network connection. By using this procedure, IPD 100 prevents port scanning client 103 from spoofing its true network address. Consequently, port scanning client is prevented from sending a large number of identical network connection requests containing different network source addresses in which all but one of the network addresses are invalid. This procedure eliminates network address spoofing due to the fact that port scanning client 103 is forced to establish a full TCP connection with IPD 100 before obtaining any useful information regarding the ports of servers 113. As a result, IPD 100 obtains a known and valid network address for port scanning client 103 when port scanning client 103 attempts to scan all ports on one of servers 113.

Once IPD 100 obtains a known and valid network address for port scanning client 103, the second network connection may be established. If the particular port on one of servers 113 is not available, IPD 100 will fail in its attempt to establish the second network connection. IPD 100 may terminate the first network connection after failing to establish the second network connection. While the termination of the first network connection informs port scanning client 103 of an inability to establish connection to the particular port of one of servers 113, and thus permits port scanning client 103 to perform a "connect type" port scan, IPD 100 obtains port scanning client 103 actual network address as part of this procedure. As such, well known techniques for detecting and protecting servers 113 from connect port scanning procedures may be used to reduce any harm which may result from such port scanning activities.

Figure 1B:
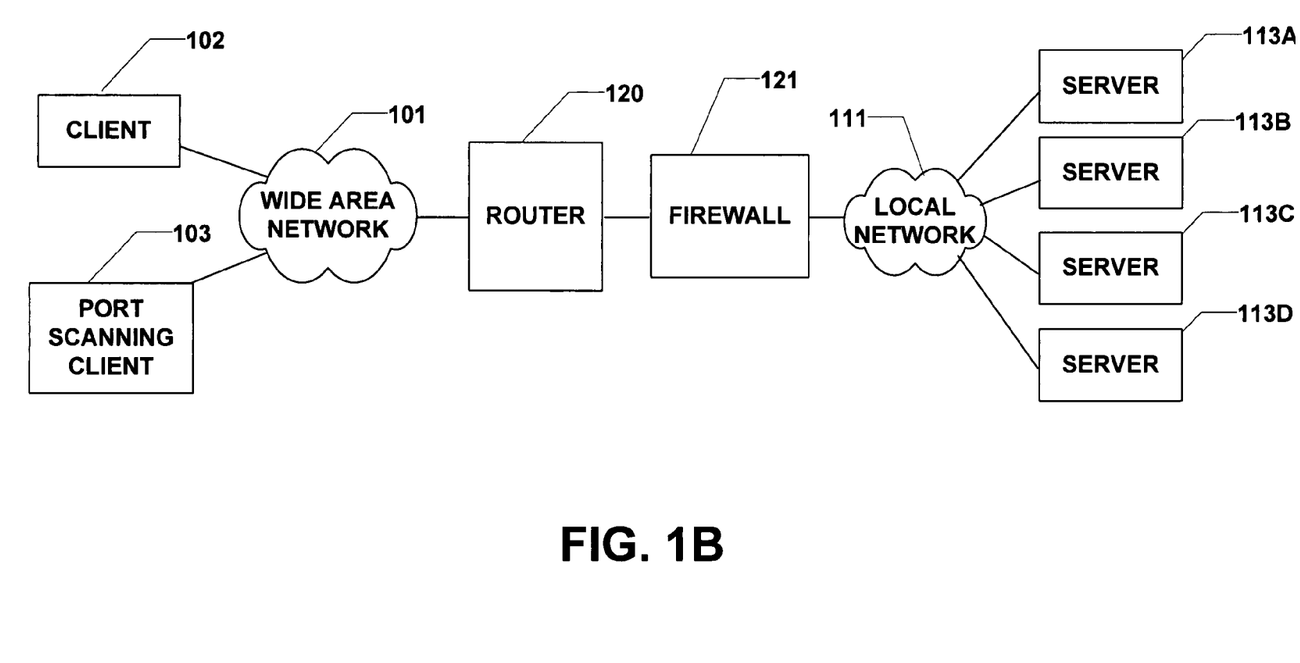
FIG. 1B is a block diagram illustrating an example network environments including a network router that demonstrate the principles of the invention.

FIG. 1B is a block diagram illustrating an example network environment that is substantially similar to the network environment of FIG. 1A. In the example embodiment of FIG. 1B, router 120 operates as an intrusion prevention device (IPD), and is coupled to local network 111 via firewall 121. In this embodiment, router 120 intercepts service access requests from client 102 and port scanning client 103, and establishes the first network connections with the client and the port scanning client before establishing the second network connection with the requested one of servers 113, as described above in reference to FIG. 1A. In requiring the establishment of the first network connection between client 102 and router 120 prior to establishment of the second network connection between router 120 and one of servers 113, port scanning activities of clients, such as port scanning client 103, may be detected using well known techniques. In addition, router 120 performs functions of a network router used to route data packets between network 101 and firewall 121.

Firewall 121 may also be coupled to router 120 to further prevent undesired network connections from being established with servers 113A. Because firewall 121 is located between router 120 and servers 113, port scanning client 103 may not detect the presence of firewall 121 without establishing the first network connection with router 120. Of course, firewall 121 may be located anywhere between router 120 and servers 113 while operating according to principles of the present invention. In addition, firewall 121 may not be present between router 120 and servers 113 if router 120 operates according to principles of the present invention.

Figure 2A:
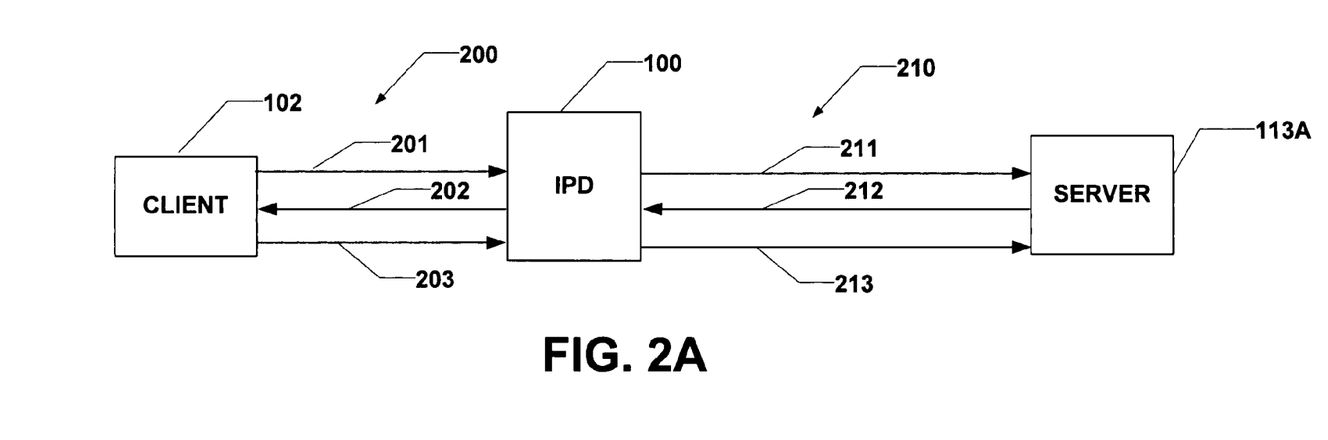
FIG. 2A is a block diagram illustrating the interception of a network service request and the establishment of a network connection between a client and a server in accordance with principles of the invention

FIG. 2A is a block diagram illustrating the interception of a network service request and the establishment of a network connection between a client and a server in accordance with principles of the invention. For purposes of illustration, FIG. 2A is described in reference to portions of FIG. 1, and with respect to TCP, although the techniques may readily be applied to other networking protocols.

Client 102 establishes a first network connection 200 with IPD 100 as part of ultimately establishing a network connection with server 113A. In order to establish first network connection 200, client 102 issues a client SYN data packet 201, i.e. a client service request data packet, to the IP address associated with server 113A. Client SYN data packet 201 provides IPD 100 an IP address for client 102, the IP address for server 113A, the IP address of the one of servers 113, and a port ID for a TCP port on server 113A for use in the network connection.

IPD 100 intercepts the service request, and responds to client SYN data packet 201 with IPD SYN-ACK data packet 202, i.e. an IPD service response data packet. First network connection 200 is established when client 102 returns client ACK data packet 203, i.e., a client connection acknowledgement data packet, in response to IPD SYN-ACK data packet 202. IPD 100 includes within SYN-ACK data packet 202 encrypted data within an ACK_No header field associated with establishment of this particular network connection. Client 102 returns the encrypted data within client ACK data packet 203 in order both to provide IPD 100 with needed data to establish first network connection 200 and to confirm that client 102 responded to IPD SYN-ACK data packet 202.

Once first network connection 200 is established between client 102 and IPD 100, IPD 100 establishes a second network connection 210 with server 113A. Second network connection 210 is established using an exchange of three data packets: IPD SYN data packet 211, i.e. an IPD service request data packet, server SYN-ACK data packet 212, i.e. a server service response data packet, and IPD ACK data packet 213, i.e., an IPD connection acknowledgement data packet. IPD SYN data packet 211 attempts to establish a network connection with the port ID referenced in client SYN data packet 201 when the network connection 200 was established. In this example, the port on server 213 referenced by the desired port ID is open to incoming network connection requests. Consequently, server 113A responds with server SYN-ACK data packet 212. Second network connection 210 is established when IPD 100 responds to server SYN-ACK data packet 212 with a corresponding IPD ACK data packet 213. In the event the port referenced by the port ID is not open on server 213, second connection 210 fails to establish. IPD 100 subsequently terminates first network connection 200.

Once both first network connection 200 between client 102 and IPD 100 and second network connection 210 between IPD 100 and server 113A are established, a network connection from client 102 and server 113A exists using a data service associated with the server 113A port referenced in the initial client service request, i.e. client SYN data packet 201. Subsequent data packets exchanged between client 102 and server 113A pass through IPD 100. This data packet transfer procedure is utilized until the network connection is terminated.

Figure 2B:
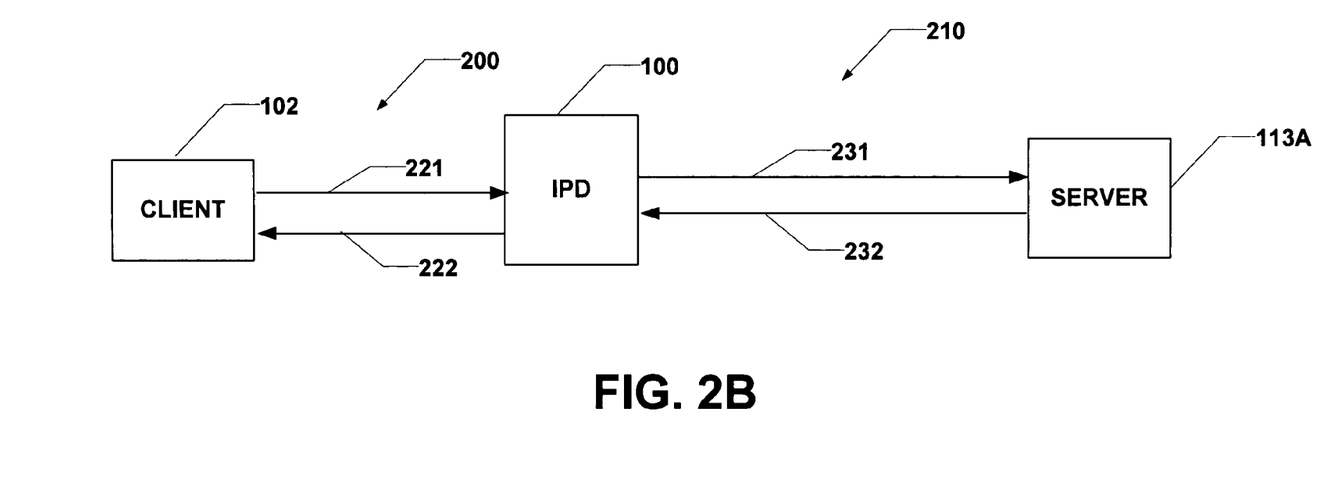
FIG. 2B is a block diagram illustrating exemplary exchange of network data packets between a client and a server using an intermediate IPD in accordance with principles of the invention.

FIG. 2B is a block diagram illustrating exemplary exchange of network data packets between a client and a server via IPD 100 in accordance with principles of the invention. For purposes of illustration, FIG. 2B is described in reference to TCP, although the techniques may readily be applied to other networking protocols.

Client 102 communicates with server 113A by transmitting data packets through IPD 100. A sequence of data packet transfer begins with client 102 transmitting client data packet 221 to IPD 100 via the first network connection 200. IPD 100 modifies the contents of client data packet 221 to generate IPD data packet 231. IPD 100 modifies, for example, various data fields within a TCP header within client data packet 221 to render IPD data packet 231 in a form expected by server 113A. IPD 100 transmits IPD data packet 231 to complete transfer of client data packet 221 to server 113A.

Server 113A typically responds with server response packet 232, which is sent to IPD 100. IPD 100 again modifies TCP header fields within server response packet 232 to generate IPD response packet 222 in a format expected by client 102. IP response packet 222 is transferred from IPD 100 to client 102 to complete the data packet transfer process. In the transfer of data packets through IPD 100, TCP header fields are modified to provide both client 102 and server 113A with port ID data that conforms to a network connection formed directly between each other. In this manner, IPD may be transparent to client 102, server 113A, or both. In addition, TCP sequence number fields and TCP acknowledgement number fields need to correctly correspond to an increasing set of values for each data packet transferred from client 102 to server 113A through IPD 100 as well as each data packet transferred from server 113A to client 102 through IPD 100. IPD 100 modifies each exchanged data packet and updates a checksum contained within the TCP header of each data packet in order to make the needed transformations of the data packets as they pass through IPD 100.

Figure 3:
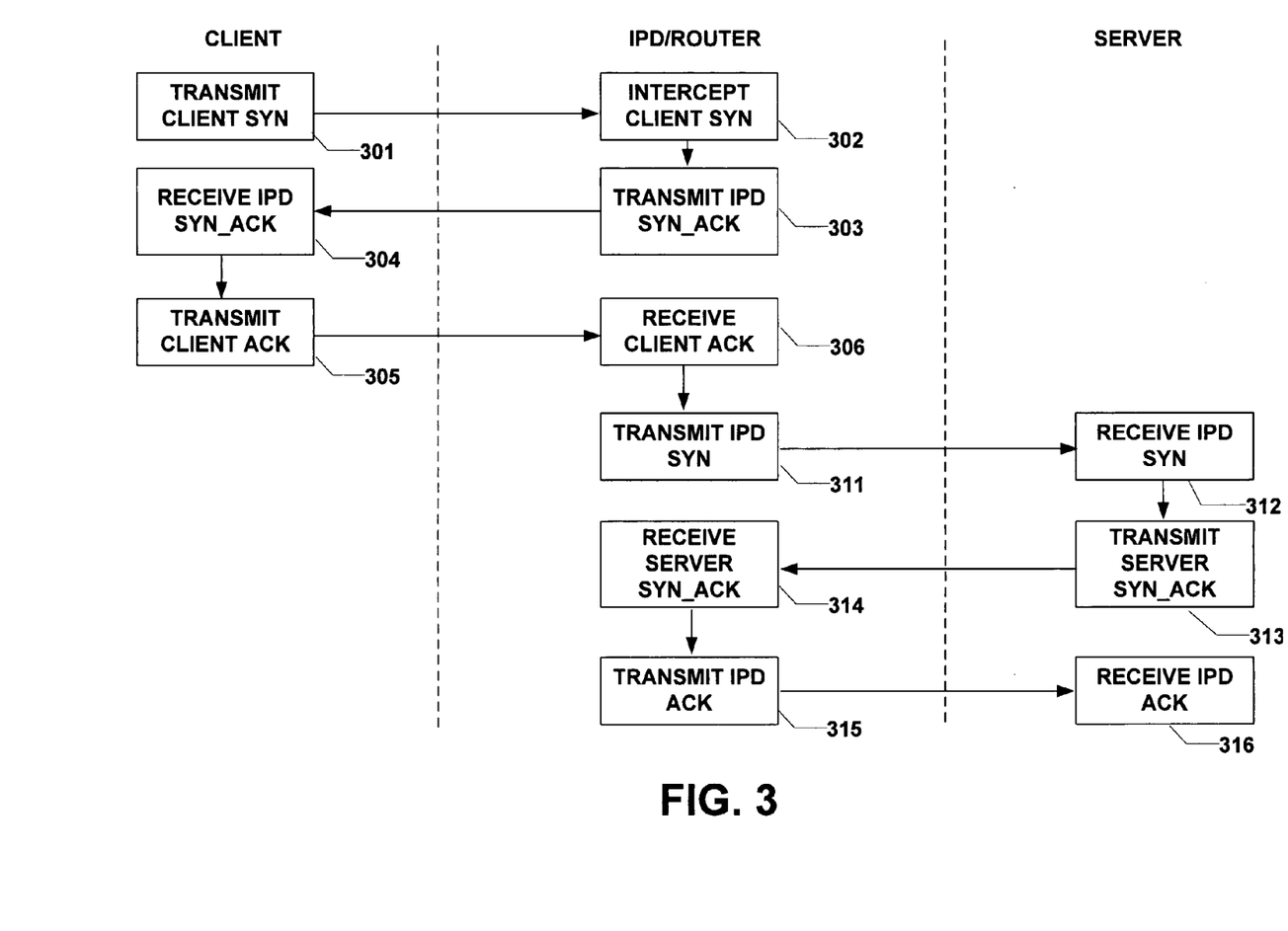
FIG. 3 is a flow chart illustrating example operation of an intrusion prevention device establishing a network connection between a client and a server in accordance with the principles of the invention.

FIG. 3 is a flow chart illustrating example operation of an IPD, such as IPD 100 of FIG. 2A, configuring a network connection between a client and a server in accordance with the principles of the invention. Establishment of a network connection between, for example, client 102 and server 113A begins when client 102 transmit a client SYN data packet 201 (301) to a network address associated with server 113A. Within client SYN data packet 201, various TCP header fields contain particular values:

FLAGS: SYN set
Destination Port (Dest_Port): $P_1$
Source Port (Src_Port): $P_2$
Sequence Number (Seq_No): $X_1$
Acknowledgement Number (Ack_No): 0

A SYN flag is set within client SYN data packet 201 to indicate that client 102 is attempting to establish a first network connection 200 (FIG. 2A). Dest_Port within client SYN data packet 201 identifies a server port on server 113A with which client 102 is attempting to establish a network connection. Typically, Dest_Port values within client SYN data packets 201 refer to well known server ports corresponding to well known computing services used within network connections. For example, a Dest_Port value of 80 refers to an attempt to establish a network connection with an http service on server 113A. IPD 100 sets Src_Port header field to an unused and not well-known server port open on IPD 100. Well-know server ports are typically TCP ports identified with Port ID values between 0 and 1023. Port ID values between 1024 and 65565 identify not well-known server ports. Seq_No header field and contains a initial data value, $X_1$, used to provide a starting value for an increasing sequence of ID numbers for all subsequent TCP data packets transmitted over first network connection 200.

IPD 100 intercepts client SYN data packet 201 of FIG. 2A (302) that indicates client 102 is initiating a network connection. IPD 100 responds to client SYN data packet 201 by transmitting (303) IPD SYN-ACK data packet 202 to client 102. IPD 100 responds with IPD SYN-ACK data packet 202 prior to determining whether a particular port on server 113A specified within client SYN data packet 201 is open. Within IPD SYN-ACK data packet 202, the following TCP header fields contain relevant data:

FLAGS: SYN and ACK flag bits set
Destination Port (Dest_Port): $P_2$
Source Port (Src_Port): $P_1$
Sequence Number (Seq_No): $Y_1$
Acknowledgement Number (Ack_No): $X_1+1$ Both SYN flag bit and ACK flag bit are set within TCP header flag fields of IPD SYN-ACK data packet 202 to indicate to client 102 that IPD 100 is responding to the previously transmitted client SYN data packet 201. IPD 100 uses a unique not well-known port ID on IPD 100, and correspondingly on server 113A, for each separate network connection established with client processing systems such as client 102 and port scanning client 103. Src_Port header field contains the Port ID value form the Src_Port header field within client SYN data packet 201. Seq_No header field contains a starting value for a sequence number, $Y_1$, used within all data packets transmitted from IPD 100 to client 102. ACK_No header field contains a data value from Seq_No header field within client SYN data packet 201 incremented by 1, $X_1+1$.

Data value $Y_1$ transmitted within Seq_No header field of IPD SYN-ACK data packet 202 is determined by encrypting a set of data values corresponding to network connection parameters associated with first network connection 200. The first 27 bits of Y1 correspond to an encrypted six-tuple using Client_IPaddress, IPD_IPaddress, Client_Port_number, Client-Seq_No, IPD_Port_Number, and Secret_number. Client_IPaddress corresponds to the IP address for client 102. IPD_IPaddress corresponds to the IP address for IPD 100. Client_Port_number corresponds to Dest_Port header field value of client SYN data packet 201. IPD_Port_Number corresponds to the Dest_Port header field value from IPD SYN-ACK data packet 202. Secret_number corresponds to a predetermined data value used such that client 102 cannot calculate the decrypted contents of Y1, and thus attempt to scan ports on server 113A, without establishing a full network connection including its actual IP address. These data values are encrypted by IPD 100 such that client 102, or any other processing system, may not determine the contents of these values.

In one embodiment, the six-tuple is encrypted using a one-way cryptographic hash function. A cryptographic hash function cannot be decomposed into its component members from the encrypted data value. As such, a hash data value that includes a secret number is its input values cannot be determined by an unscrupulous client in an attempt to spoof IPD 100. Only a response sent from a recipient of a data packet containing such an encrypted data value could return an expected data value in subsequent data packets.

Client 102 receives IPD SYN-ACK data packet 202 (304) and subsequently transmits (305) client ACK data packet 203 to IPD 100. When IPD 100 receives client SYN data packet 203, first network connection 200 is established. Within client ACK data packet 203, the following TCP header fields contain relevant data:

FLAGS: ACK flag bit set
Destination Port (Dest_Port): $P_1$
Source Port (Src_Port): $P_2$
Sequence Number (Seq_No): $X_1+V$
Acknowledgement Number (Ack_No): $Y_1+V$ In client ACK data packet 203, the ACK flag bit is set to indicate to IPD 100 that client 102 is responding to the previously transmitted IPD SYN-ACK data packet 202. Dest_Port header field contains a data value corresponding to the Port ID used by client 102 when transmitting its initial network connection request in client SYN data packet 201. Src_Port header field contains a data value corresponding to the Port ID used by IPD 100 when transmitting its responsive IPD SYN-ACK data packet 202. Seq_No header field contains a data value corresponding to the sequence number used in client SYN data packet 201 that has been incremented by one. Using this procedure, each data packet transmitted from client 102 to IPD 100 will use a Seq_No incremented by a predetermined value, V, from the previously used Seq_No data value. For an SYN_ACK data packet, the predetermined value, V, equals one. For all subsequent data packets, the predetermined value is the size in bytes of the transmitted data packet. Ack_No header field contains a data value corresponding to the Seq_No received from IPD 100 within IPD SYN-ACK data packet 202 that has been incremented by the predetermined value, V.

When IPD 100 receives client ACK data packet 203 (306), first network connection 200 is established. IPD 100 may use the contents of the ACK data packet and a saved value for the previously used secret number to compute a received version of an encrypted six-tuple. This received version of the encrypted six-tuple is compared to an expected value for this data packet to determine whether the ACK data packet is received in response to a previously sent SYN_ACK data packet. If this received version of the encrypted six-tuple does not match the expected value for the six-tuple, IPD 100 may suspect that client ACK data packet 203 was not properly transmitted from client 102 in response to IPD SYN-ACK data packet 202. In this situation, IPD 100 does not establish first network connection 200, which may occur in the event an unscrupulous client is attempting a stealth scan.

If IPD 100 determines that first network connection 200 has been properly established, IPD 100 establishes second network connection 210 by transmitting IPD SYN packet 211 (311) to client 113A. Within IPD SYN data packet 211, various TCP header fields contain relevant values:
  FLAGS: SYN set
  Destination Port (Dest_Port): $P_1$
  Source Port (Src_Port): $P_2$
  Sequence Number (Seq_No): $X_1$
  Acknowledgement Number (Ack_No): 0

IPD 100 sets a SYN flag within client SYN data packet 201 to indicate to server 113A that IPS 100 is attempting to establish second network connection 210. Dest_Port within IPD SYN data packet 201 indicates an identity of a server port on server 113A in which IPD 100 attempts to establish a network connection. The server port ID data value corresponds to the port ID transmitted by client 102 to IPD 100 in client SYN data packet 201 when first network connection 200 was established. Server 113A sets Src_Port header field to an unused and not well-known server port open on server 113A. Seq_No header field and contains a initial data value, $X_1$, used to provide a starting value for an increasing sequence of ID numbers for all subsequent TCP data packets transmitted over second network connection 210. The data value $X_1$ corresponding to the same $X_1$ value used by client 102 in client SYN data packet 201 may be used as an initial sequence number because IPD 100 and client 102 will be utilizing the same value for data packets over first network connection 200 and second network connection 210 once both network connections are established. By utilizing the same initial sequence number $X_1$ for both first network connection 200 and second network connection 210, IPD 100 would not need to modify subsequent data packets for this TCP header field for all data packets transmitted between client 102 and server 113A after second network connection 210 is established.

Once server 113A receives IPD SYN data packet 211 (312), server 113A transmits server SYN-ACK data packet 212 to IPD 100 if its port corresponding to Dest_Port header field of IPD SYN data packet 211 is open (313). If the server 113A port is not open, second network connection 210 is not established and IPD 100 terminates first network connection 200. Within server SYN-ACK data packet 212, the following TCP header fields contain relevant data:
  FLAGS: SYN and ACK flag bits set
  Destination Port (Dest_Port): $P_2$
  Source Port (Src_Port): $P_1$
  Sequence Number (Seq_No): $Z_1$
  Acknowledgement Number (Ack_No): $X_1+V$ Server 113A sets both SYN flag bit and ACK flag bit within TCP header flag fields of server SYN-ACK data packet 212 to indicate to IPD 100 that server 113A is responding to the previously transmitted IPD SYN data packet 211 Src_Port header field contains the Port ID value form the Src_Port header field within IPD SYN data packet 211. Seq_No header field contains a starting value for a sequence number, $Z_1$, used within all data packets transmitted from server 113A to IPD 100. Ack_No header field contains a data value from Seq_No header field within IPD SYN data packet 211 incremented by the predetermined value, V, $X_1+V$. Server 113A may also utilize the same procedure to generate initial Ack_No $Y_1$ used by IPD 100 in generating its initial Ack_No $Z_1$. Because server 113A only establishes network connections with IPD 100, server 113A may also use any other procedure to select an initial Seq_No data value $Z_1$ as server 113A presumably does not expect IPD 100 to attempt to perform an undesirable stealth port scan of server 113A.

When IPD 100 receives server SYN-ACK data packet 212 (314), IPD 100 responds by transmitting IPD ACK data packet 213 (315). Within IPD ACK data packet 213, the following TCP header fields contain relevant data:
  FLAGS: ACK flag bit set
  Destination Port (Dest_Port): $P_1$
  Source Port (Src_Port): $P_2$
  Sequence Number (Seq_No): $X_1+V$
  Acknowledgement Number (Ack_No): $Z_1+V$ In IPD ACK data packet 213, IPD 100 sets the ACK flag bit to indicate to server 113A that IPD 100 is responding to the previously transmitted server SYN-ACK data packet 212. Dest_Port header field contains a data value corresponding to the Port ID used by IPD 100 and client 102 when transmitting its initial network connection request in client SYN data packet 201 and IPD SYN data packet 211. Src_Port header field contains a data value corresponding to the Port ID used by IPD 100 when transmitting its responsive server SYN-ACK data packet 212. Seq_No header field contains a data value corresponding to the sequence number used in IPD SYN data packet 211 that has been incremented by a predetermined value, V. As noted above, the predetermined value, V, equals one for an SYN_ACK data packet. For all subsequent data packets, the predetermined value, V, is the size in bytes of the transmitted data packet. Using this procedure, each data packet transmitted from IPD 100 to server 113A will use a Seq_No incremented by the predetermined value from the previously used Seq_No data value. Ack_No header field contains a data value corresponding to the Seq_No received from server 113A within server SYN-ACK data packet 212 that has been incremented by the predetermined value.

When server 113A receives IPD ACK data packet 213 from IPD 100 (316), second network connection 210 is established. With both first network connection 200 and second network connection 210 established, client 102 communicate with server 113A by transmitting data packets to IPD 100 over first network connection 200. IPD 100 then forwards the data packets to server 113A over second network connection 210. Responsive data packets are transmitted over second network connection 210 to IPD 100, and then over first network connection 200 to client 102. This procedure is followed until either client 102 or server 113A terminates its corresponding network connection.

As noted above with respect to FIG. 2 and FIG. 3, router 102 may be used in place of IPD 100 to provide port scanning mitigation according to principles of the present invention. The exchange of messages discussed herein to establish a connection between a client 102 and one of the servers 113 are applicable to router 120 in a similar manner as discussed herein with respect to IPD 100.

Figure 4:
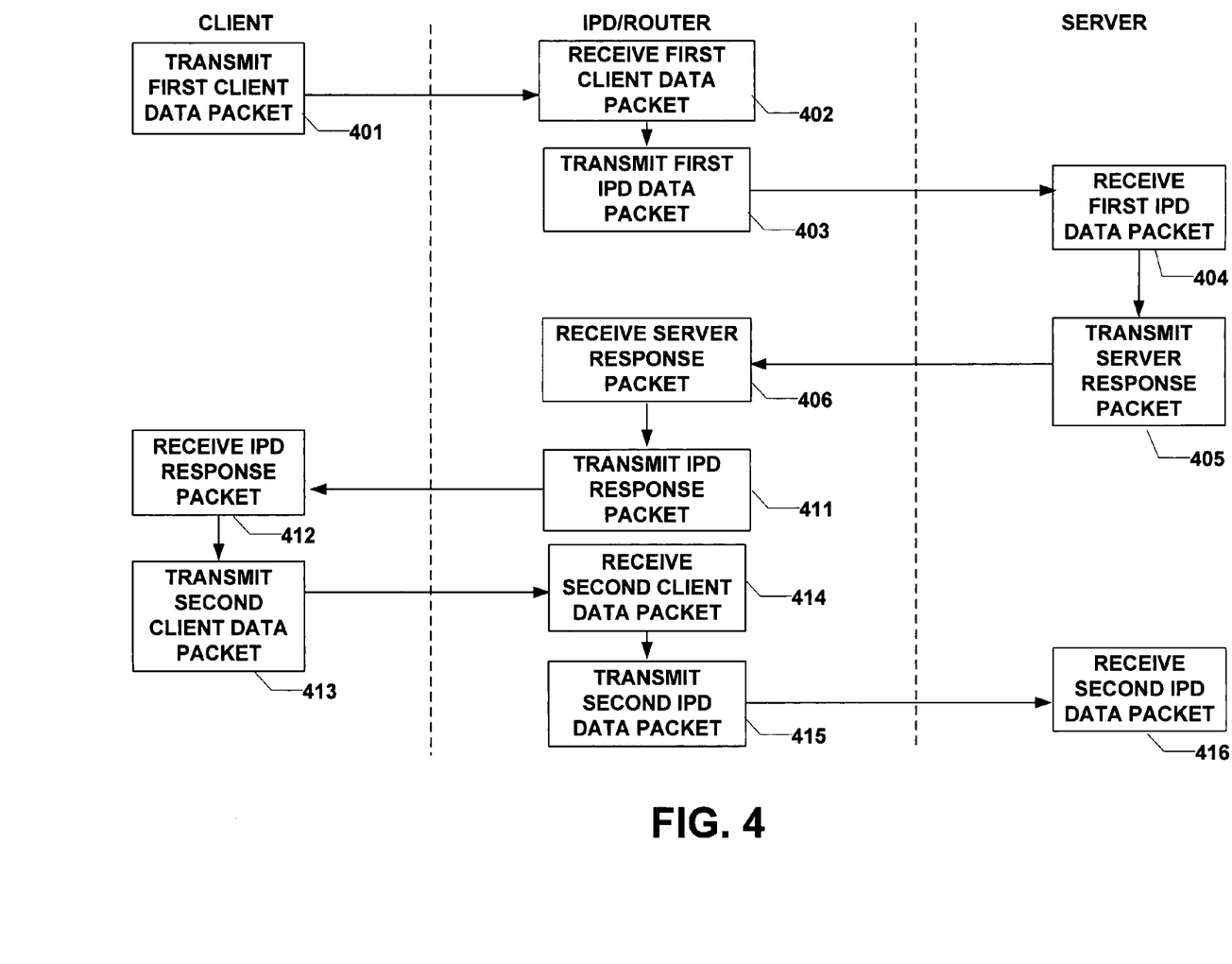
FIG. 4 is a flow chart illustrating example operation of a router generating routing information in accordance with the principles of the invention.

FIG. 4 is a flow chart illustrating in further detail operation of an IPD, such as IPD 100 of FIG. 2B, in transferring data packets between a client and a server in accordance with the principles of the invention. In particular, client 102 transmits a client data packet 221 to IPD 100 via connection 200 (401). In this example, client data packet 221 corresponds to the n-th data packet transmitted from client 102 to server 113A since both first network connection 200 and second network connection were established. Client data packet 221 contains TCP header fields containing the following data values:

FLAGS: No flag bit set
Destination Port (Dest_Port): $P_1$
Source Port (Src_Port): $P_2$
Sequence Number (Seq_No): $X_1+Q$
Acknowledgement Number (Ack_No): $Y_1+R$ The Dest_Port data value, P2, Src_Port data value, initial Seq_No, and initial Ack_No, Y1, correspond to the data values determined when first network connection 200 was established, as referred to in FIG. 3. Data values Q and R above, contain the sum of n prior increases added to the initial sequence numbers from all messages transferred over this connection. Because the sequence number is incremented by one for SYN-ACK data packets and by the size in bytes of a transmitted data packet, the values for Q and R are maintained as the sequence of n data packets are exchanged. As such, these data values for Seq_No and Ack_No may also be generated by incrementing the previously used Seq_No and Ack_No during the transmission of each of the n data packets transmitted.

When IPD 100 receives client data packet 221 (402), the IPD generates IPD data packet 231 for transmission to server 113A. IPD 100 modifies TCP header fields in client data packet 221 when generating IPD data packet 231. When first network connection 200 and second network connection 210 were established, IPD 100 stored within its memory three data values for use in forwarding data packets between client 102 and server 113A. These five data values are client IP Address, server IP address, IPD Src_Port, Server Src_Port, and ΔAck_No. IPD Src_Port corresponds to the not well known TCP Port number, $P_2$, generated by IPD 100 when establishing first network connection 200. Server Src_Port corresponds to the not well-known TCP Port number, $P_1$, generated by server 113A when establishing second network connection 210. Saved values client IP Address, server IP address, IPD Src_Port, and Server Src_Port are used to match an incoming data packet with the network connection pass through IPD 100. Once a match is found, ΔAck_No data value is retrieved. ΔAck_No data value corresponds to a numeric difference between the initial acknowledgment number, Ack_No Z1, generated by server 113A when establishing second network connection 210 and the initial acknowledgement number, Ack_No Y1, generated by IPD 100 when establishing first network connection 200, (Z1-Y1).

IPD 100 modifies TCP header fields in client data packet 221 when generating IPD data packet 231. IPD adds ΔAck_No to the Ack_No header field data value, X1 to generate IPD data packet 231. Using these substituted data values, IPD 100 generates a new TCP header checksum value for inclusion within IPD data packet 231. Once these three modifications are made in generating IPD data packet 231, IPD transmits IPD data packet 231 to server 113A (403). Server 113A receives IPD data packet 231 (404) and passes the contents of the data packet to the corresponding service in server 113A for processing.

Server 113A generates a responsive data packet and transmits server response packet 232 to IPD for forwarding to client 102 (405). Server response packet 232 contains TCP header fields containing the following data values:

FLAGS: No flag bit set
Destination Port (Dest_Port): $P_1$
Source Port (Src_Port): $P_2$
Sequence Number (Seq_No): $Y_1+S$
Acknowledgement Number (Ack_No): $Z_1+T$ IPD 100 receives server response packet 232 (406) and modifies TCP header fields in order to permit forwarding of the data packet to client 102. IPD 100 modifies TCP header fields in server response packet 232 when generating IPD response packet 222. Data values S and T above, contain the sum of all prior increases added to the initial sequence numbers from all messages transferred over this connection. Because the sequence number is incremented by one for SYN_ACK data packets and by the size in bytes of a transmitted data packet, the values for S and T are maintained as the sequence of data packets are exchanged. IPD subtracts ΔAck_No to the Ack_No header field data value, $Z_1$ to generate IPD response packet 222. Using these substituted data values, IPD 100 generates a new TCP header checksum value for inclusion within IPD response packet 222. Once these modifications are made in generating IPD response packet 222, IPD 100 transmits IPD response packet 22 to client 102 (411). Client 102 receives IPD response packet 222 (412) and passes the contents of the data packet to the corresponding process in client 102 for subsequent processing.

Client 102 may transmit a second data packet in response to receipt of IPD response packet 222. This subsequent data packet is transmitted (413) as a client data packet 221 to IPD 100 using the process described above. IPD 100 receives (414) this subsequent client data packet, generates a subsequent IPD data packet using the TCP header field data value substitutions described above, and transmits the subsequent IPD data packet to client 113A (415). Server 113A receives the subsequent IPD data packet for use in subsequent data processing and data communications (416). This process continues in the described manner until either server 113A or client 102 terminates the network connection.

As noted above with respect to FIG. 2 and FIG. 3, router 102 may be used in place of IPD 100 to provide port scanning mitigation according to principles of the present invention. The exchange of messages discussed herein to utilize a connection between a client 102 and one of the servers 113 are applicable to router 120 in a similar manner as discussed herein with respect to IPD 100.

Figure 5:
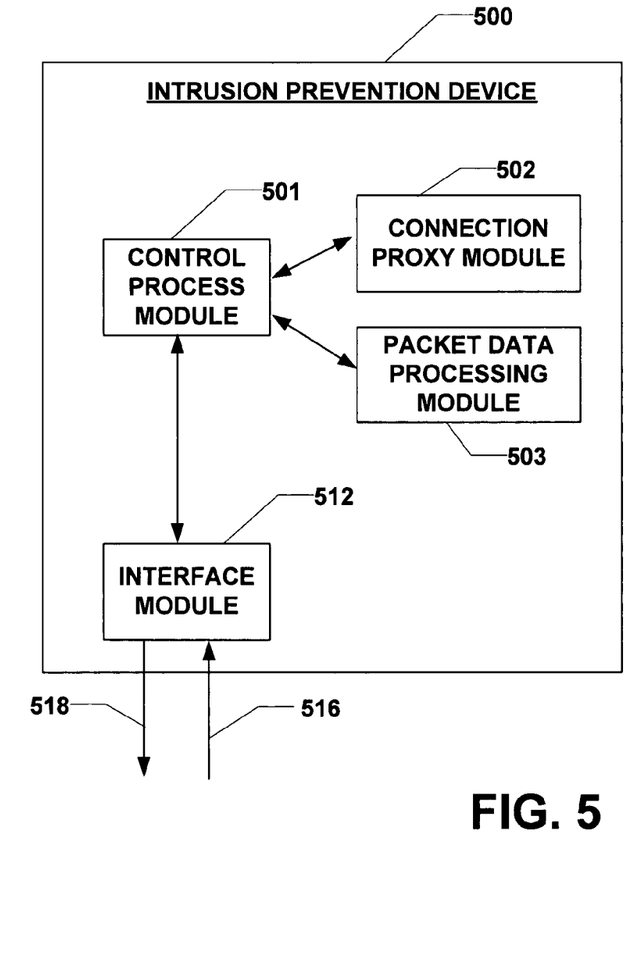
FIG. 5 is a block diagram illustrating an example embodiment of an intrusion prevention device consistent with principles of the invention.

FIG. 5 is a block diagram illustrating an example embodiment of an intrusion prevention device (IPD) 500 consistent with principles of the invention. In the illustrated embodiment of FIG. 5, IPD 500 includes an interface module 512 that receives and sends packet flows via network links 516 and 518, respectively. Interface module 512 is typically coupled to network links 516, 518 via a number of interface ports (not shown), and forwards and receives packets and control information to and from control process module 501. IPD 500 may include a chassis (not shown) having a number of slots for receiving a set of cards, including interface module 512. Each module may be inserted into a corresponding slot of the chassis for electrically coupling the card to control process module 501 via a bus, backplane, or other electrical communication mechanism.

In operation, IPD 500 may receives inbound packets from network link 516, determine destinations for the received data packets, and outputs the data packets on network link 518 based on the destinations. More specifically, upon receiving an inbound data packet via one of inbound link 516, interface module 512 relays the data packet to control process module 501. In response, control process module 501 reads data from the data packet in order to determine how the data packet is to be further processed.

IPD 500 further comprises a connection proxy module 502 and a packet data processing module 503 to support processing of network data packets within IPD 500. Connection proxy module 502 performs processing associated with establishment of full network connections between clients and servers, e.g., between client 102 and server 113A of FIG. 1, as described in reference to FIG. 3. During establishment of a network connection, connection proxy module 502 receives incoming client SYN packets 201 and client ACK packets 203 from client 102, for example, and generates IPD SYN-ACK packets. Similarly, connection proxy module 502 generates outgoing client IPD packets 211 and client IPD packets 213 to server 113A, and receives server SYN-ACK packet 212 during establishment of a network connection between IPD 500 and a server, such as server 113A.

Packet data processing module 503 performs processing associated with maintaining a working network connection, such as a connection between client 102 and server 113A, without use of a proxy server process as described in reference to FIG. 4. During the transfer of data packets through the network connection, packet data processing module 503 receives incoming client data packets 221 and generates IPD data packet 232 to transfer data from client 102 to server 113A through IPD 500. Similarly, packet data processing module 603 receives incoming server response packet 232 from server 113A and generates IPD response packet 222 to transfer data packets from server 113A to client 102 through IPD 500.

Figure 6:
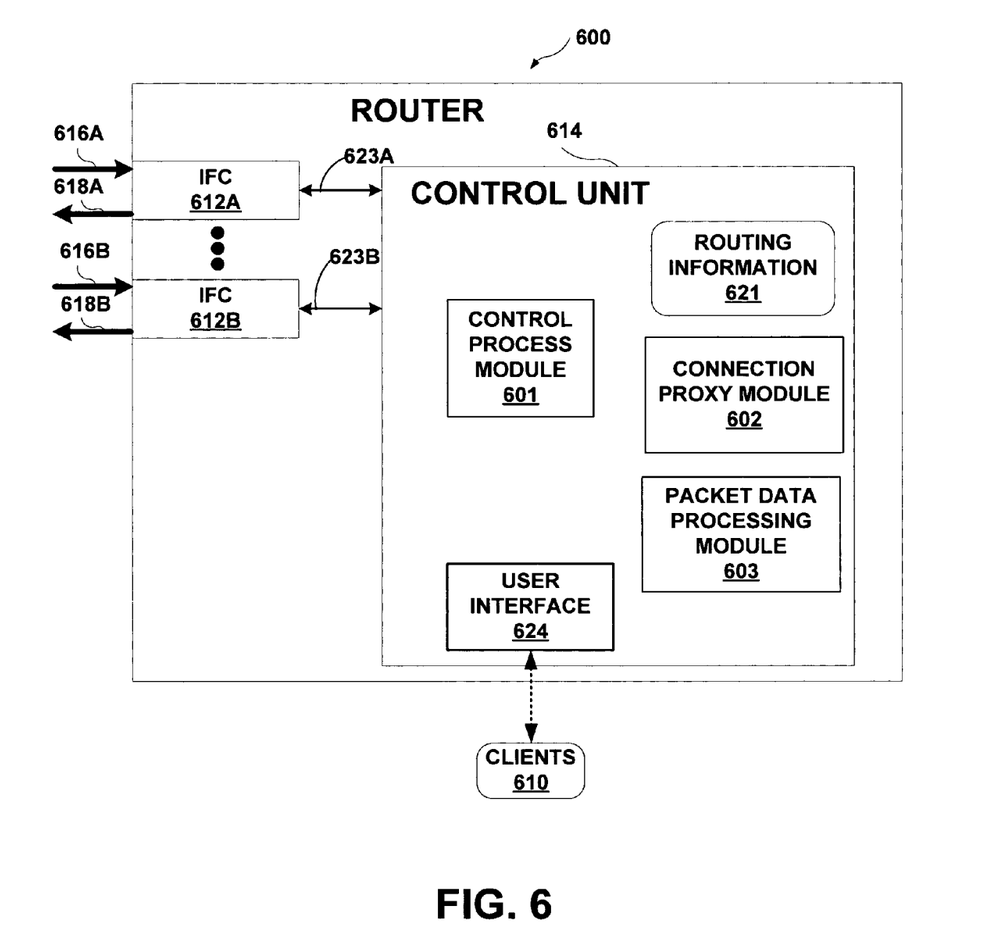
FIG. 6 is a block diagram illustrating an example embodiment of a router consistent with the principles of the invention.

FIG. 6 is a block diagram illustrating an example embodiment of a router 600 that operates as an intrusion prevention device consistent with the principles of the invention. Router 600 includes a control unit 614 that maintains routing information 621 that describes the topology of a network, including routes through the network. Control unit 614 periodically updates routing information 621 to accurately reflect the topology of the network. Control unit 614 may maintain routing information 621 in the form of one or more tables, databases, link lists, radix trees, databases, flat files, or any other data structures.

Router 600 further includes interface cards (IFCs) 612A-612B (collectively, "interface cards 612") that receive and send packet flows via network links 616A-616B (collectively, "inbound network links 616") and 618A-618B (collectively, "outgoing network links 618"), respectively. Interface cards 612 are typically coupled to network links 616, 618 via a number of interface ports (not shown), and forward and receive packets and control information to and from control unit 614 via a respective interface 623A-623B. Router 600 may include a chassis (not shown) having a number of slots for receiving a set of cards, including interface cards 612. Each card may be inserted into a corresponding slot of the chassis for electrically coupling the card to control unit 614 via a bus, backplane, or other electrical communication mechanism.

In operation, router 600 receives inbound packets from inbound network links 616, for example, determines destinations for the received data packets, and outputs the data packets on outbound network links 618 based on the destinations. More specifically, upon receiving an inbound data packet via one of inbound links 616, a respective one of interface cards 612 relays the data packet to control unit 614. In response, control unit 614 reads data from the data packet, referred to as the "key," that includes a network destination for the data packet. The key may comprise one or more parts of the data packet. The key may, for example, contain a routing prefix for another router within the network. Based on the destination, control unit 614 analyzes routing information 621 to select a route for the data packet.

Control unit 614 further comprises control process module 601, connection proxy module 602 and packet data processing module 603 to support prevention of stealth scanning in accordance with the techniques described herein. Control process module 601 receives incoming data packets and performs the data analysis needed to properly route data packets.

Connection proxy module 602 performs processing associated with establishment of a full network connection between a client and a server for which router 600 is configured to act as a proxy. With respect to FIG. 2A, for example, connection proxy module 602 receives an incoming client SYN data packet 201 and a client ACK data packet 203 from client 102, and generates IPD SYN-ACK data packet 202 during the establishment of a network connection with client 102. Similarly, connection proxy module 602 generates outgoing IPD SYN packet 211 and IPD ACK packet 213 to server 113A and receives server SYN-ACK data packet 212 during establishment of a network connection with server 113A.

Packet data processing module 603 performs processing associated with maintaining a working network connection between a client and a server, such as client 102 and server 113A, without use of a proxy server process. As described in reference to FIG. 4, during the transfer of data packets through the network connection, packet data processing module 603 receives incoming client data packet 221 and generates IPD data packet 232 to transfer data from client 102 to server 113A through router 600. Similarly, packet data processing module 603 receives incoming server response packet 232 from server 113A and generates IPD response packet 222 to transfer data packets from server 113A to client 102 through router 600.

Router 600 includes user interface 624 connected to clients 610 to provide an interface mechanism for controlling the operation of router 601. Clients 610 provide commands and receive data regarding the operation of router 601 through user interface 624. For example, clients 610 may provide configuration information specifying the servers for which router 600 is to act as a proxy. Control process module 601 processes these commands to cause operations to occur within router 600. These commands may also cause to retrieve status data from within router 600 for output to user 624.

Although packet-based networks are described herein, other types of data units may also be used consistent with the principles of the invention. For instance, the term "packet" is used to generally describe a unit of data communicated between resources in conformance with a communication protocol. The principles of the invention may be readily applied to a variety of protocols that utilize a multi-data packet establishment procedure, such as Transmission Control Protocol (TCP), and the like. Accordingly, "packet" is used to encompass any such unit of data, and may be interchanged with the term "cell," or other similar terms used in such protocols to describe a unit of data communicated between resources within the network.

In addition, although the techniques have been described as elements embodied within a network device, the described elements may be distributed to multiple devices. The term "system," is used herein to generally refer to embodiments of the invention in which the described elements are embodied within a single network device or distributed to multiple network devices.

Various embodiments of the invention have been described. These and other embodiments are within the scope of the following claims.

What is claimed is:

1. A method comprising:
   intercepting a client service request from a client to a server, at an intrusion prevention device (IPD) positioned between the client and a firewall device, wherein the client service request comprises a client synchronization (SYN) data packet that specifies a network address of the client and requests a network service from the server using a specified port;
   regardless of whether the specified port is open, generating, with the IPD, a synchronization-acknowledgement (SYN-ACK) data packet that includes an initial sequence number for a connection with the client, wherein generating the SYN-ACK comprises performing a one-way hash to encrypt a set of data values and setting the initial sequence number of the SYN-ACK to include the encrypted set of data values, the set of data values including the network address and the port specified in the SYN data packet intercepted from the client a network address and a port of the IPD that intercepted the SYN data packet and a secret number;
   transmitting the SYN-ACK data packet from the IPD to the client;
   receiving, with the IPD, a client acknowledgement (ACK) data packet from the client;
   with the IPD, encrypting a set of data values that includes the secret number and contents of the ACK data packet;
   comparing the encrypted set of data values included within the SYN-ACK by the IPD with the encrypted set of data values computed from the contents of the ACK data packet to determine whether the ACK data packet is received in response to the previously sent SYN-ACK data packet;
   establishing a network connection between the IPD and the server through the firewall when the ACK data packet was received in response to the SYN-ACK data packet previously sent to the client by the IPD; and
   transmitting data packets between the client and the server through the IPD when the network connection between the IPD and the server is successfully established using the specified port wherein transmitting data packets comprises modifying sequence numbers of the data packets with the IPD to conform to sequence numbers of the network connection between the IPD and the server and sequence numbers of the network connection between the IPD and the client.

2. The method of claim 1, wherein establishing a network connection between the IPD and the server comprises attempting to establish the network connection between the IPD and the server using the specified port only after successfully establishing the network connection between the client and the IPD.

3. The method of claim 2, further comprising terminating the network connection between the client and the IPD when the network connection between the IPD and the server cannot be established using the specified port.

4. The method of claim 2, wherein attempting to establish a network connection between the IPD and the server comprises attempting to establish the network connection between the IPD and the server in accordance with the transmission control protocol (TCP).

5. The method of claim 1, wherein transmitting data packets between the client and server through the IPD and modifying the sequence numbers of the data packets comprises:
   receiving the data packets transmitted by the client over the network connection between the client and IPD;
   modifying the sequence numbers of the data packets from the client to conform to the sequence numbers of the network connection between the IPD and the server; and
   forwarding the modified data packets over the network connection from the IPD to the server.

6. The method of claim 1, wherein transmitting data packets between the client and server through the IPD and modifying the sequence numbers of the data packets comprises:
   receiving the data packets transmitted by the server over the network connection between the server and IPD;
   modifying the sequence numbers of the data packets from the server to conform to the sequence numbers of the network connection between the IPD and the client; and
   forwarding the modified data packets over the network connection from the IPD to the client.

7. The method of claim 1,
   wherein intercepting a client service request comprises intercepting the client service request with a router having a control unit that operates as the IPD, and
   wherein attempting to establish a network connection comprises attempting to establish the network connection between the router and the client without regard to whether the server provides the requested service on the specified port.

8. A computer-readable medium comprising instructions for causing a processor within an intrusion prevention device to:
   intercept, at an intrusion prevention device (IPD) positioned between a client and a firewall, a client service request from the client to a server, wherein the client service request comprises a client synchronization (SYN) data packet that specifies a network address of the client and requests a network service from the server using a specified port;
   regardless of whether the specified port is open on the server, generate, with the IPD, a synchronization-acknowledgement (SYN-ACK) data packet that includes an initial sequence number for a connection with the client, wherein generating the SYN-ACK comprises performing a one-way hash to encrypt a set of data values and setting the initial sequence number of the SYN-ACK to include the encrypted set of data values, the set of data values including the network address and the port specified in the SYN data packet intercepted from the client a network address and a port of the IPD that intercepted the SYN data packet and a secret number;
   transmit the SYN-ACK data packet from the IDP to the client;

receive, with the IDP, a client acknowledgement (ACK) data packet from the client;

with the IPD, encrypt a set of data values that includes the secret number and contents of the ACK data packet;

compare the encrypted set of data values included within the SYN-ACK by the IDP with the encrypted set of data values computed from the contents of the ACK data packet to determine whether the ACK data packet is received in response to the previously sent SYN-ACK data packet;

establish a network connection between the IDP and the server using the specified port when the ACK data packet was received in response to the SYN-ACK data packet previously sent to the client by the IDP; and transmit data packets between the client and the server through the IPD when the network connection between the IPD and the server is successfully established using the specified port, wherein the instructions cause the processor to modify sequence numbers of the data packets with the IDP to conform to sequence numbers of the network connection between the IDP and the server and the network connection between the IDP and the client.

9. The computer-readable medium according to claim 8, wherein the instructions cause the processor to attempt to establish the network connection between the IPD and the server using the specified port only after successfully establishing the network connection between the client and the IPD.

10. The computer-readable medium according to claim 9, wherein the instructions cause the processor to terminate the network connection between the client and the IPD when the network connection between the IPD and the server cannot be established using the specified port.

11. The computer-readable medium according to claim 9, wherein the instructions cause the processor to attempt to establish the network connection between the IPD and the server in accordance with the transmission control protocol (TCP).

12. The computer-readable medium according to claim 8, wherein the instructions cause the processor to:
  receive the data packets transmitted by the client over the network connection between the client and IPD;
  modify the sequence numbers of the data packets from the client to conform to the sequence numbers of the network connection between the IPD and the server; and
  forward the modified data packets over the network connection from the IPD to the server.

13. The computer-readable medium according to claim 8, wherein the instructions cause the processor to:
  receive the data packets transmitted by the server over the network connection between the server and IPD;
  modify the sequence numbers of the data packets from the server to conform to the sequence numbers of the network connection between the IPD and the client; and
  forward the modified data packets over the network connection from the IPD to the client.

14. The computer-readable medium according to claim 8, wherein the instructions cause the processor to attempt to establish the network connection between the IPD and the server in accordance with the transmission control protocol (TCP).

15. The computer-readable medium according to claim 8, wherein the instructions cause the processor to intercept the client service request with a router, and
  wherein the instructions cause the processor to attempt to establish the network connection between the router and the client without regard to whether the server provides the requested service on the specified port.

16. An intrusion prevention device comprising:
  a control process module;
  a connection proxy module for establishing a first network connection with a client in response to a request to establish a network connection from the client to a server using a specified server port, wherein the connection proxy module establishes a second network connection with the server in response to the request after the first network connection is established; and
  a packet data processing module for transferring packets between the client and server through the intrusion prevention device,
  wherein the connection proxy module establishes the first network connection with a synchronization-acknowledgement (SYN-ACK) data packet that includes an initial sequence number for the first network connection with the client,
  wherein the connection proxy module generates the SYN-ACK by performing a one-way hash to encrypt a set of data values and setting the initial sequence number of the SYN-ACK based to include the encrypted set of data values, the set of data values including a network address and port of the client as specified in the SYN data packet intercepted from the client, a network address and a port of the IPD, and a secret number, and
  wherein the packet data processing module transmits the data packets by modifying sequence numbers of the data packets to conform to sequence numbers of the network connection between the IDP and the server and the network connection between the IDP and the client.

17. The intrusion prevention device according to claim 16, wherein the connection proxy module establishes the first network connection with the client prior to determining whether a server port on the server corresponding to the specified server port is open.

18. The intrusion prevention device according to claim 16, wherein the intrusion prevention device comprises a network router.

* * * * *

UNITED STATES PATENT AND TRADEMARK OFFICE
CERTIFICATE OF CORRECTION

| | | |
|---|---|---|
| PATENT NO. | : 7,664,855 B1 | Page 1 of 1 |
| APPLICATION NO. | : 10/839187 | |
| DATED | : February 16, 2010 | |
| INVENTOR(S) | : Freed et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1674 days.

Signed and Sealed this

Seventh Day of December, 2010

David J. Kappos
*Director of the United States Patent and Trademark Office*